March 4, 1969  T. W. HOTCHKISS  3,431,375
HYDRAULIC FLOW MONITORING DEVICE
Filed March 6, 1967  Sheet 1 of 2

INVENTOR.
Thomas W. Hotchkiss
BY
AGENT

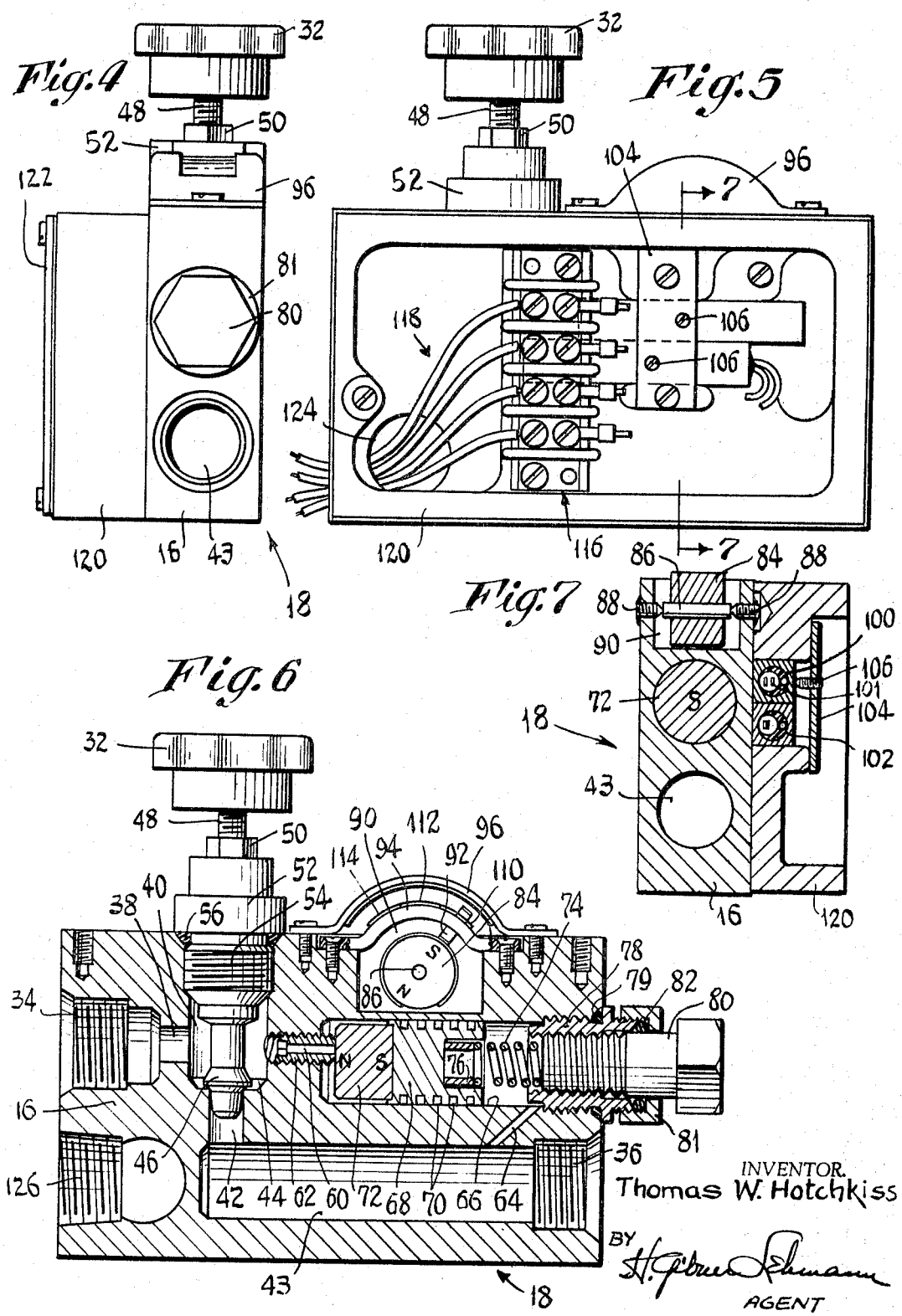

United States Patent Office

3,431,375
Patented Mar. 4, 1969

3,431,375
HYDRAULIC FLOW MONITORING DEVICE
Thomas W. Hotchkiss, Orange, Conn., assignor to Eldorado Tool & Mfg. Corp., Milford, Conn., a corporation of Connecticut
Filed Mar. 6, 1967, Ser. No. 620,903
U.S. Cl. 200—82
Int. Cl. H01h 35/38
15 Claims

ABSTRACT OF THE DISCLOSURE

An indicating and/or control device which is responsive to small pressure variations in a high pressure hydraulic system of the type used to supply coolant to cutting tools such as drills and the like. The device comprises a casing which is provided with a fluid inlet and outlet, and which has a valve for carrying the fluid flow and dropping the pressure through it. Connected across the valve is an auxiliary fluid line having an intermediate portion which acts as a cylinder. A sensitive spring-biased piston is movable in the cylinder, and assumes a position determined by the pressure differential resulting from the partially closed valve. Any small, even momentary, change in pressure, i.e. flow in the inlet or outlet line shifts the piston, and if the change persists the piston assumes a new position. The piston movement causes an observable deflection of a pointer on the casing and also a simultaneous electrical control, all without impeding the piston to any observable extent. In effecting this, a magnet carried by the piston actuates a magnetic indicator and the same magnet also actuates magnetic reed switches to provide both for visual readings and control of equipment.

CROSS REFERENCES (1) U.S. Patent No. 2,791,657.
(2) U.S. Patent No. 2,892,051.
(3) U.S. Patent No. 2,963,565.
(4) U.S. Patent No. 3,034,357.
(5) U.S. Patent No. 3,070,232.
(6) U.S. Patent No. 3,077,176.
(7) U.S. Patent No. 3,077,854.
(8) U.S. Patent No. 3,125,062.

BACKGROUND

This invention relates to flow monitoring devices, and more particularly to devices of this nature which work with pressure differentials in a high-pressure hydraulic system, to provide indications and control functions that are responsive to variations in the flow of hydraulic fluid.

In the past there have been proposed a number of flow monitoring devices having pressure-actuated elements, and visual indicators as well as control switches. These devices have had various drawbacks. For example, they have been unable to provide a sufficiently sensitive response where high hydraulic pressures were involved; they are too large, bulky, complicated and costly; and they were difficult to adjust and calibrate, and prone to malfunctioning and failure.

SUMMARY

The present invention obviates the above disadvantages and drawbacks of prior hydraulic flow-monitoring devices, and objects of the invention include the provision of a novel and improved hydraulic flow monitor which will accurately adequately respond to flow variations on the order of 10% in a high-pressure hydraulic system involving working pressures on the order of 1500 p.s.i.; the provision of a flow-monitoring device of this kind, which is particularly sensitive in its response while at the same time being particularly rugged in construction; the provision of a monitoring device as above, which handles the said pressures safely and without the likelihood of malfunctioning or failure; a device of the above nature, which is small, compact, relatively inexpensive, easily installed and operated, easily understood, and readily adjusted and calibrated to suit the requirements of the installation.

Other objects are to provide an improved indicating-type flow monitoring device which is easily read, which has a relatively large scale, which provides a multiplicity of control functions, which fully meets accepted hydraulic and electrical standards, which is hermetically sealed and has switch, terminal and indicator compartments that are fully sealingly isolated from the fluid-carrying portions of the device; to provide a device as characterized above, which functions independently of its mounting position, and which can be directly interposed at any convenient location in a coolant, lubricant or other hydraulic supply line; and to provide, in a flow monitoring device of the kind under consideration, an especially sensitive yet especially rugged and reliable pressure-differential-responsive element constituting in effect the prime mover of the indicator and control mechanisms.

The above objects are accomplished by providing, in a high-pressure-resistant casing adapted to be inserted in a coolant or other hydraulic line, a passage for hydraulic fluid and an adjustable impedance device in the form of an adjustable valve for setting up a differential pressure for a given flow through said passage, in conjunction with an auxiliary fluid line connected across the valve and having an intermediate portion constituted as a cylinder in which there is a particularly sensitive spring-biased piston. The position of the sensitive piston is a function of the pressure differential or drop resulting from the impedance device or partially closed valve and is thus a function of variations of flow in the coolant or other line. By magnetically actuating an indicator and switches through use of a magnet carried by the shiftable piston, the load on the piston is virtually nil and also the hydraulic system in the casing is kept separate from the indicator and switches which, however, respond to different positionings of the piston to thereby function in response to variations in the flow of the coolant or hydraulic fluid.

The inventive concept as explained above is characterized by great sensitivity and ruggedness, as well as by an advantageous simplicity and well-proved individual physical principles whereby there results a reliable and practical device of considerable utility.

Other features and advantages will hereinafter appear.

In the drawings:

FIG. 4 is a right end elevational view of the monitoring device.

FIG. 5 is a view like that of FIG. 2 but with a side cover plate removed to reveal interior electrical circuit details of the device.

FIG. 6 is a vertical section, taken on the line 6—6 of FIG. 3.

FIG. 7 is a vertical section taken on the line 7—7 of FIG. 5.

Figure 1:
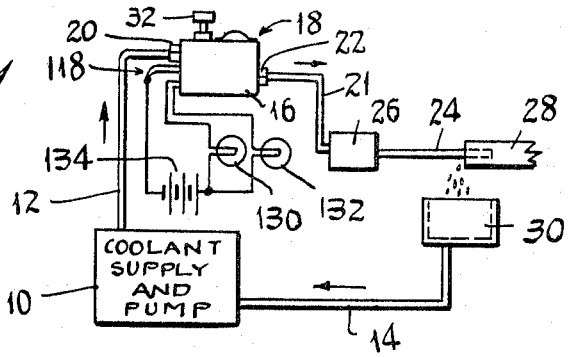
FIG. 1 is a diagrammatic representation of a high pressure hydraulic system for supplying coolant to a gun drill, said system incorporating the pressure or flow monitoring device of the invention.

Considering first the hydraulic system illustrated in FIG. 1, the rectangle 10 represents a coolant supply such as a storage tank and power-driven pump by which coolant solution is forced out through an outlet line 12 and brought back through an inlet line 14. The coolant from the outlet line 12 enters the casing 16 of the present improved flow-monitoring device 18, by means of a suitable hydraulic fitting 20. The coolant leaves the monitoring device 18 through a delivery line 21 connected to the casing 16 by a fitting 22. The delivery line 21 supplies the coolant to a coolant-using instrumentality, as for example a gun drill 24, this being effected in any suitable manner as by a connection to a base 26 of the drill. The gun drill 24 is hollow, having a passage by which the coolant from the base 26 is brought to the work 28 that is being drilled. When the coolant leaves the work 28 it can fall into a collecting container 30 from which it is brought back to the pump and supply unit 10 through the return line 14. The flow monitoring device 18 has a manually settable valve handle 32 by which the pressure drop for a given flow through the lines 12, 21 may be regulated.

Referring now particularly to FIG. 6, the hydraulic casing 16 is shown as having inlet and outlet ports 34 and 36 which accommodate respectively the fittings 20 and 22. The ports 34, 36 are connected or joined within the casing 16 by passages 38, 40, 42 and 43 which include an annular valve seat 44 engageable by a valve 46 carried by a threaded shank 48 on which the knob 32 is mounted. A lock nut 50 on the shank 48 enables the setting of the valve to be locked. This is effected by engagement of the nut with a packing fitting 52 having threads 54 by which the latter is screwed into the upper portion of the vertical passage 40. An O-ring 56 provides a seal between the fitting 52 and the casing 16. The valve 46, 44 constitutes an adjustable, high-rated impedance which results in a pressure drop across it that varies with the rate of flow through it, as can be understood by analyzing the hydraulic system as shown.

By the above organization the flow of coolant passing through the ports 34, 36 and passages 38, 40, 42 and 43 can be monitored by means of the drop across the valve, and such drop is adjustable by setting of the valve 46 through turning of the knob 32. The valve may be locked in any desired position to fix the drop, by tightening the lock nut 50.

In accordance with the present invention the casing 16 is constituted to withstand appreciable pressures, being preferably of metal by which values on the order of 1500 p.s.i. are readily handled, this being also true of the valve 46. Further there is provided on or in the casing 16 an especially sturdy and sensitive, pressure-drop responsive means which is responsive to small variations of flow in either the inlet line 12 or the delivery line 21, as for instance variations of as little as plus or minus 10%, said means acting simultaneously in a unique manner on an associated visual indicator and on electrical control devices to effect an advantageous monitoring of the flow.

Flow variations beyond this magnitude have been found to have an adverse effect in the use of the gun drill 24 when boring the work 28. Such drop-responsive means is shown herein as providing, with virtually no restraint on its movement, a reliable indication of the change in flow and also a reliable control by which associated equipment may be automatically actuated as a consequence of said change.

In effecting this, the invention provides, in the casing 16, means forming an auxiliary fluid passage or chamber which bypasses the valve 44, 46, said auxiliary passage comprising the bore 60 of a hollow throttling screw 62 which communicates with the passage 40, and further comprising a small connecting passage 64 communicating with the outlet passage 43 and also with a relatively large bore 66 in the casing 16, extending generally parallel to the passage 43 and being shown as of commensurate diameter therewith.

The bore 66 constitutes a cylinder, in which there is a sensitive-responsive fluid barrier constituted, in accordance with the invention, as an annularly grooved piston 68 having a plurality of grooves 70 to provide a low-drag labyrinth seal between it and the cylinder walls. Hydraulic fluid collects in the grooves 70 and provides a low-drag seal between the piston 68 and its cylinder. The piston 68 also carries a plug 72 constituted as a permanent magnet, having north and south poles at its ends respectively as indicated. A helical compression spring 74 engaging a spacer sleeve 76 in a bore of the piston 68, also engages an adjustment screw 80 threaded into a closure plug 78 screwed into the casing 16. A packing and locking nut 81 having a ring seal 82 is threaded on the plug 78 to lock and seal the spring adjusting screw 80. The spring 74 normally biases the piston 68 to a leftmost position as illustrated in FIG. 6. The closure plug 78 is sealed to the casing 16 by means of an O-ring 79, as shown.

With the above organization, fluid pressure will be experienced by the left end of the permanent magnet 72 and the left end portions of the piston 68, resulting from the fluid in the bore 60 of the throttling screw 62 and in the passage 40 ahead of the valve 46. Also, fluid pressure will be exerted against the right end of the piston 68 as viewed in FIG. 6, by virtue of the fluid which exists in the bore 66 and connecting passage 64 communicating with the outlet passage 43 of the casing.

The fluid pressure beyond the valve 46, that is, the pressure which is exerted against the right end of the piston 68 will be of lesser value than the fluid pressure ahead of the valve 46, which is exerted against the left face of the piston and against the permanent magnet 72, by virtue of the pressure drop caused by the valve 46 which is understood to be maintained in a somewhat closed condition. In consequence of this, the piston 68 and magnet 72 will be shifted an extent to the right, to a normal operating position somewhat removed from the position illustrated in FIG. 6.

Variations in the pressure differential or drop acting on the sensitive-response, labyrinth-seal type piston 68 will result in the latter shifting and thereby occupying different axial positions, either to the left or to the right of the normal position which can be established by adjustment of the valve 46, taking into account the pressure of the coolant, the action of the compression spring 74 and possibly adjustment of the latter, and the characteristics of the hydraulic system (which is illustrated diagrammatically in FIG. 1), such characteristics also including the resistance to flow which occurs at the cutting end of the gun drill 24.

Also in accordance with the present invention, use is made of the shifting of the labyrinth-seal piston 68 in response to variations in the pressure and flow of coolant passing through the casing 16, to operate a physically movable member so as to give an indication of whether or not the flow has departed from the desired normal or useful value. Additionally, an automatic electric control is had by which equipment may be actuated in response to the altered rate of flow which causes the shifting of the piston 68, all of the foregoing being effected with virtually no restraint being imposed on the sensitive-response piston. The indicator device as clearly illustrated herein comprises a drum or wheel 84 carried on a shaft 86 which at its ends engages pivot screws 88 threaded into the hydraulic casing 16. The drum 84 is disposed in a recess 90 in the upper portion of the casing 16, and is connected with an indicator arm or pointer 92 adapted to travel over an arcuate scale 94 affixed to the casing 16 by screws as shown. A transparent cover or housing member 96 encloses the scale 94 and pointer 92, and is also affixed to the casing 16 by screws as illustrated in FIG. 6.

The drum 84 is constituted of permanent magnet material, and has poles as indicated in FIG. 6, whereby it will readily follow the movement of the piston 68 and cause the pointer 92 to traverse the scale 94. The north pole of the drum 84 is attracted to the south pole of the magnetic plug 72 which is affixed to the piston 68. As the piston 68 shifts from left to right, a counterclockwise turning movement of the drum 84 will occur, resulting in an indication being had with the pointer 92 travelling over the scale 94.

In addition to the indicating means as provided above, encapsulated magnetic-reed type electric switches are provided, also to be responsive to the positioning of the magnetic plug 72. Thus, restraint of the piston 68 is eliminated, whereas the frictional drag thereon is minimized by omitting packings, rings and the like and using instead groove-type or labyrinth seals. Referring to FIG. 7, a normally open capsule switch 100 is shown in its open condition, below which there is a normally open capsule switch 102 shown in its closed condition. These switch conditions are the result of the piston position of FIG. 6. The switches 100, 102 have blades of magnetic metal, as for example the blade 101 indicated in FIG. 7. The switches 100, 102 are retained in place in any suitable manner, as by means of a clamping strip 104 and set screws 106. As seen in FIG. 7, the switches 100, 102 adjoin the permanent magnet plug 72 carried by the piston 68. Accordingly, the magnetism of the plug influences the switches as well as the drum 84. When the piston 68 is retained in its operative position shifted somewhat to the right from the position illustrated in FIG. 6, the switches 100 and 102 will both be closed, since the magnetic blades will be attracted toward their cooperable blades by the magnetism of the plug 72. If a decrease in flow in the delivery line 21 occurs (as when the line clogs), the resulting pressure-drop will be less and the relative influence of the spring 74 greater. This will shift the piston 68 to the left from normal, and the switch 100 will open due to decreased magnetic influence, whereas the switch 102 will remain closed. If for some reason there is an increased rate of flow in the line 21 (as by virtue of a break or leak), this will result in a greater pressure drop across the valve, whereupon the spring 74 will yield under the relatively greater pressure drop as the piston 68 shifts to the right. This will result in the switch 102 becoming open due to weaker magnetism, and the switch 100 remaining closed. The switches are oppositely positioned as regards their ends so as to respond oppositely in this manner. Accordingly, the opening of the upper switch 100 will indicate a decrease in the flow through the discharge passage 43 and line 21, whereas opening of the switch 102 will indicate an increase in the rate of flow in the line 21 and passage 43. With a condition of normal flow, adjustment of the valve 46 is made to locate the piston 68 in a null or centralized position wherein the pointer 92 will be approximately in the center of the scale 94 and both switches 100, 102 will be closed.

The scale 94 may be divided roughly into thirds, a red zone 110, a green zone 112 and a yellow zone 114, whereby a color coded indication is had. The green or center portion of the scale will indicate that the existing rate of flow is normal and satisfactory, whereas an abnormal decrease in flow will be indicated by the pointer moving to the red portion 110 of the scale, and an abnormal increase in flow will be indicated by the pointer moving to the yellow portion 114 of the scale.

Figure 2:
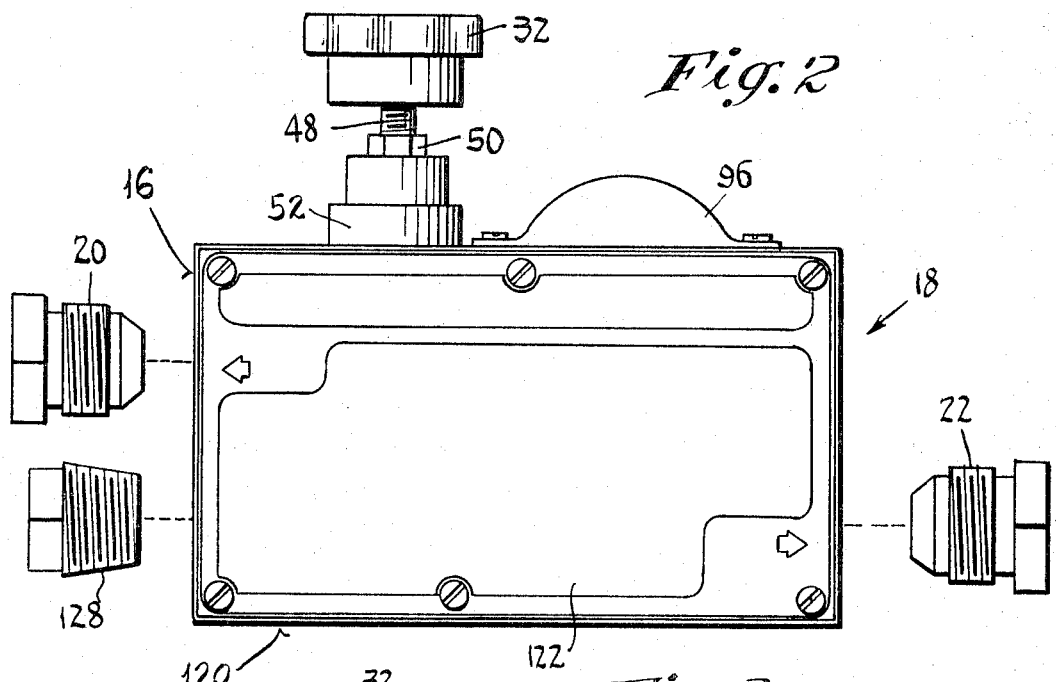
FIG. 2 is a side elevational view of the monitoring device.
Figure 3:
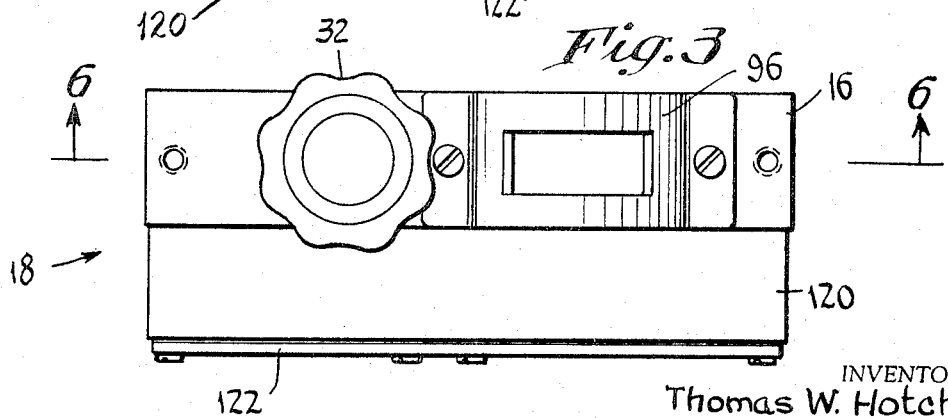
FIG. 3 is a top plan view of the monitoring device.

In FIG. 5, connections of the switches 100, 102 to a terminal strip 116 are indicated, and wires 118 of the external control circuit are illustrated as being brought into a switch-and-terminal casing 120 which is secured to the hydraulic casing 16 by suitable screws and sealant. The switch-terminal casing 120 has a closure or name plate 122 as seen in FIGS. 2–4. The wires 118 pass through an opening 124 in the hydraulic casing 16, said opening communicating with a port 126 also in the hydraulic casing 16. A conduit fitting 128 is adapted to be threaded into the port 126, in the usual manner.

The electrical circuit illustrated in FIG. 1 shows indicator lights 130, 132 connected with a battery 134 and with the wires 118 going to the switches 100, 102 whereby either one light or the other will be illuminated for a decreased flow or an increased flow condition. Where normal flow exists, with the switches 100, 102 both closed, the lamps 130, 132 will both be lighted. In place of the lamps 130, 132 relays may be utilized to actuate related equipment such as the coolant supply, power of the work 28 or the gun drill 24, etc.

A brief summary of the operation of the flow-responsive, monitoring device of the invention is as follows: Considering FIG. 1, the nature of the work 28 and the size and type of gun drill 24, together with the type of coolant and any other pertinent factors are considered in determining the desired rate of flow of the coolant. The flow monitoring device 18 is so arranged that when this rate of flow exists, adjustment of the manually operable valve 46, 32 or of the spring adjustment screw 80 or both can locate the indicator needle 92 at the center of the scale 94, approximately midway in the green portion 112 thereof. At the start of a work run, the work 28 and the gun drill 24 are placed in position ready to carry out the drilling operation. The valve 46 is opened fully, and the coolant supply 10 is made operative to obtain a flow of coolant through the drill under the desired conditions. The valve 46 is now slowly turned toward closing until the needle 92 swings to the center of the green band 112. The lock nut 50 is then tightened, to lock the valve in this adjusted position. With the indicator 92 in the green band, both the switches 100 and 102 will be closed, and the lamps 130, 132 will be energized. The drilling can now proceed. If the coolant flow in the line 21 should decrease more than 10%, resulting in a corresponding decrease in the predetermined, nulled pressure drop across the valve 46, 32 the needle 92 will move into the red band 110, and the low-flow switch 100 will open, as seen in FIG. 7, extinguishing the lamp 132. This will indicate the condition of decreased flow of the coolant to the drill. If the coolant flow in the line 21 should increase beyond 10%, the needle 92 will move into the yellow portion 114 of the scale, indicating such increase in flow. The high-flow switch 102 will now open, extinguishing the lamp 130 and indicating the condition of the increased flow. Also, flow variations in the supply line 12 due to any cause, will result in a shifting of the piston 68 and a corresponding indication by the pointer 92 and control by the switches 100, 102. The device 18 will give both a visual indication and an electrical detection of a flow variation of plus or minus 10% from any desired coolant flow setting, for a system operating at pressures on the order of 1500 p.s.i.

Examples of conditions which could cause a change in flow of coolant are backing up of chips in the drill flute, a plugged oil hole in the drill, a leaking or blown coolant transfer gland, unauthorized changes from originally set conditions, malfunction of the coolant system (valves, filters, pumps, etc.), a plugged or a ruptured coolant line or fitting, or excessive aeration of the coolant.

It will now be understood from the foregoing that I have provided a novel and improved indicator and control means which is responsive to small variations of pressure in a high pressure hydraulic system, whereby it is possible for deviations from the normal to be reliably indicated and made to actuate associated equipment.

Variations of as little as 10% in the rate of flow, in a high pressure system operating at 1500 p.s.i. will be sufficient to actuate the switches 100, 102 and to swing the indicator pointer 92 from the central green portion of the scale 94 to either the red portion 110 or else the yellow portion 114. The flow responsive device 18 is seen to be especially simple, involving relatively few parts which may be economically fabricated and assembled. The device is small and compact, and the various components may be readily manufactured by well-known techniques. The high pressure passages are wholly independent of the electrical switching and of the indicating devices and are contained wholly in a single hydraulic casing which is not likely to fail or malfunction. The casing 16 may be advantageously constituted of aluminum, for example, whereby there is no deleterious effect on the magnetic flux involved with the indicator and control switches. Adjustment or nulling of the indicator and actuating piston is easily and quickly effected, either by adjustment of the valve 46 or screw 80 or both while viewing the scale 94. Or, the nulling may be done while observing the condition of the lamps 130, 132 or other equipment connected in the electrical control circuit. Where standard flow values are established for the equipment using the coolant, the spring adjustment screw 80 may be omitted and, for the required flow setting of the valve, the spring 74 and bushing 76 can be calculated to bring the piston 68 to the center or null position. Thereafter, the null is effected solely by valve adjustment, eliminating the second adjustment represented by the screw 80. The device is entirely enclosed and sealed, and thus it is not likely to malfunction but instead can be expected to have an extended, useful life.

Variations and modifications may be made within the scope of the claims, and portions of the improvement may be used without others.

I claim:

1. A monitoring device responsive to small variations of pressure in a high-pressure hydraulic system comprising, in combination:
    (a) a casing including a completely enclosed, high-pressure hydraulic fluid passage at all times hermetically sealed from the atmosphere, said passage having an inlet and an outlet, for conducting without loss to the atmosphere fluid intended to be supplied under continuous pressure and flow to a fluid-using instrumentality,
    (b) an adjustable impedance means carried by said casing, for effecting a pressure drop in the flow of fluid through said passage, wherein the improvement comprises:
    (c) means providing an auxiliary fluid chamber and a sensitive fluid barrier reversibly movable in said auxiliary fluid chamber in response to pressure differentials on opposite sides of said barrier,
    (d) opposite portions of said auxiliary fluid chamber being connected to said high-pressure fluid passage at points respectively ahead of and beyond said impedance means, and
    (e) spring means biasing said barrier toward a position in said auxiliary fluid chamber nearest the said portion thereof connected at the said point ahead of said impedance means,
    (f) a sensing device actuated by said barrier and responding to changes in the position of said barrier in said auxiliary fluid chamber.

2. A device as in claim 1, in combination with:
    (a) a pressurized fluid supply including a supply line connected to the inlet of said fluid passage,
    (b) a fluid delivery line connected to the outlet of the fluid passage,
    (c) a fluid-using instrumentality connected to said delivery line,
    (d) means for returning fluid from said instrumentality to said fluid supply,
    (e) said casing having an enclosure in which the sensing device is disposed,
    (f) said hydraulic fluid passage being hermetically separate from said enclosure whereby the likelihood of seepage of hydraulic fluid from the passage to the enclosure is minimized.

3. A device as in claim 1, wherein:
    (a) the casing contains said auxiliary fluid chamber and barrier,
    (b) said casing including an enclosure located adjacent the barrier and in which the sensing device is disposed, and
    (c) magnetic means connected with said barrier and sensing device, for effecting a response to the latter as a consequence of movement of the barrier.

4. A device as in claim 1, wherein:
    (a) a permanent magnet is provided in the fluid chamber, connected to the barrier to move therewith,
    (b) said sensing device having a part of magnetic material interacting with the magnet in the auxiliary fluid chamber.

5. A device as in claim 4, wherein:
    (a) the barrier comprises a piston,
    (b) said casing having a bore constituting a cylinder in which the piston is reversibly movable,
    (c) said cylinder constituting an intermediate part of said auxiliary fluid chamber,
    (d) said sensing device comprising an indicator having a pivoted pointer, pivot means therefor and a dial associated with the pointer,
    (e) said magnetic material of the sensing device being carried by the pivot means of the pointer.

6. A device as in claim 5, wherein:
    (a) the casing contains the entire auxiliary fluid chamber,
    (b) said casing including an enclosure located adjacent the cylinder and piston and in which the indicator is disposed,
    (c) said hydraulic fluid chamber and auxiliary fluid chamber being hermetically separate from said enclosure whereby the likelihood of seepage of hydraulic fluid from the passage and chamber to the enclosure is minimized.

7. A device as in claim 4, wherein:
    (a) the barrier comprises a piston,
    (b) said casing having a bore constituting a cylinder in which the piston is reversibly movable,
    (c) said cylinder constituting an intermediate part of said auxiliary fluid chamber,
    (d) said sensing device comprising an electric switch having a movable blade,
    (e) said magnetic material of the sensing device being carried by said movable blade.

8. A device as in claim 7, wherein:
    (a) the casing contains the entire auxiliary fluid chamber,
    (b) said casing including an enclosure located adjacent the cylinder and piston and in which the electric switch is disposed,
    (c) said hydraulic fluid chamber and auxiliary fluid chamber being hermetically separate from said enclosure whereby the likelihood of seepage of hydraulic fluid from the passage and chamber to the enclosure is minimized.

9. A device as in claim 1, wherein:
    (a) the barrier comprises a piston,
    (b) said casing having a bore constituting a cylinder in which the piston is reversibly movable,
    (c) said cylinder constituting an intermediate part of said auxiliary fluid chamber.

10. A device as in claim 9, wherein:
    (a) the bore of the casing extends to an exterior casing surface; and
    (b) a plug sealing the mouth of the bore,
    (c) a portion of said auxiliary chamber being disposed in the side of the cylinder and communicating with the cylinder and with the said fluid passage.

11. A device as in claim 10, wherein:
    (a) said spring means comprises a compression spring engaging the piston and said plug.

12. A device as in claim 9, wherein:
    (a) the piston has at least one annular groove in which the hydraulic fluid can collect, to constitute a low-drag seal between the piston and cylinder.

13. A device as in claim 12, wherein:
    (a) the casing contains the entire auxiliary fluid chamber,
    (b) means on the casing, providing a pair of spacedapart enclosures locates adjacent the cylinder and piston,
(c) said sensing device comprising an indicator disposed in one of said enclosures,
(d) an electric switch disposed in the other of said enclosures, and
(e) magnetic means connected with said piston, indicator and electric switch for actuating the indicator and switch in response to movement of the piston without involving physical contact with the latter.

14. A device as in claim 1, wherein:
(a) means are provided for adjusting said spring means to vary the bias on the barrier.

15. A device as in claim 1, wherein:
(a) the barrier comprises a piston,
(b) said casing having a bore constituting a cylinder in which the piston is reversibly movable,
(c) said cylinder constituting an intermediate part of said auxiliary fluid chamber,
(d) the bore of the casing extending to an exterior casing surface,
(e) a plug sealing the mouth of the bore,
(f) an adjustable screw threaded into and extending axially through the plug,
(g) said spring means comprising a compression spring engaged with the piston and with said adjusting screw.

References Cited

UNITED STATES PATENTS

| | | |
|---|---|---|
| 2,618,965 | 11/1952 | Gray. |
| 2,791,657 | 5/1957 | Bloxsom et al. _____ 200—81.9 |
| 3,070,232 | 12/1962 | Casaleggi _____ 116—117 XR |

ROBERT K. SCHAEFER, *Primary Examiner.*

H. BURKS, *Assistant Examiner.*

U.S. Cl. X.R.

200—81